United States Patent Office 2,971,661
Patented Feb. 14, 1961

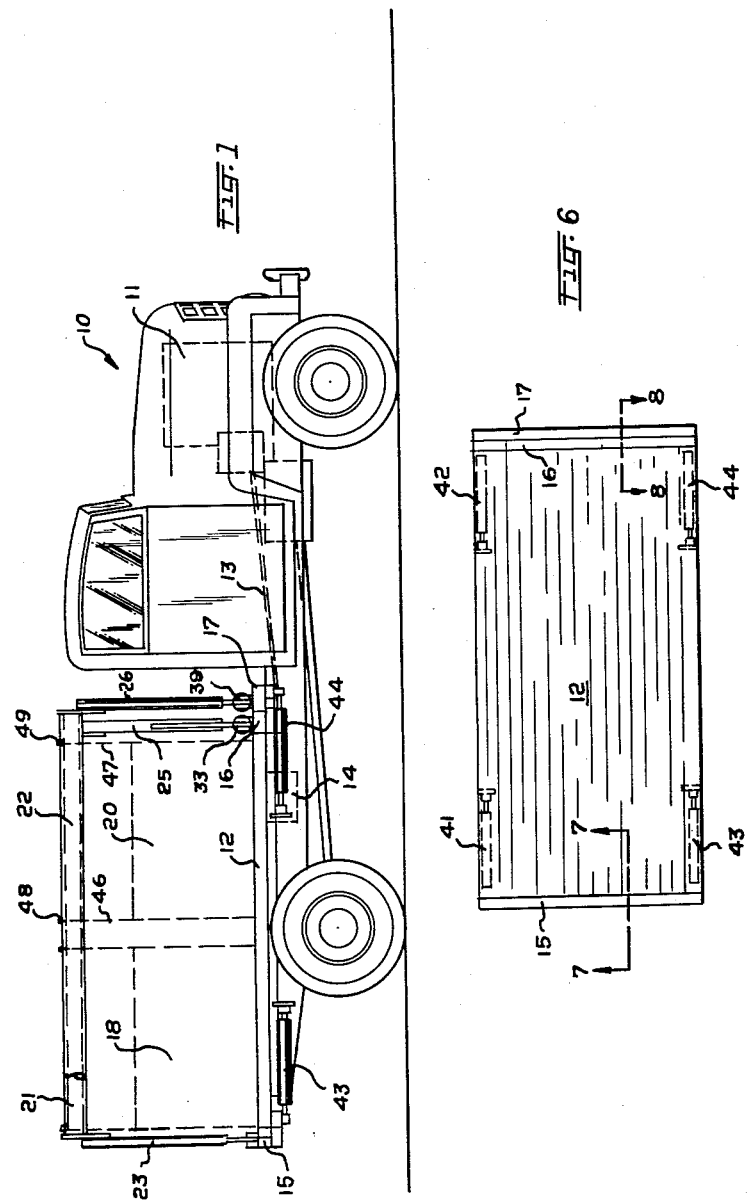

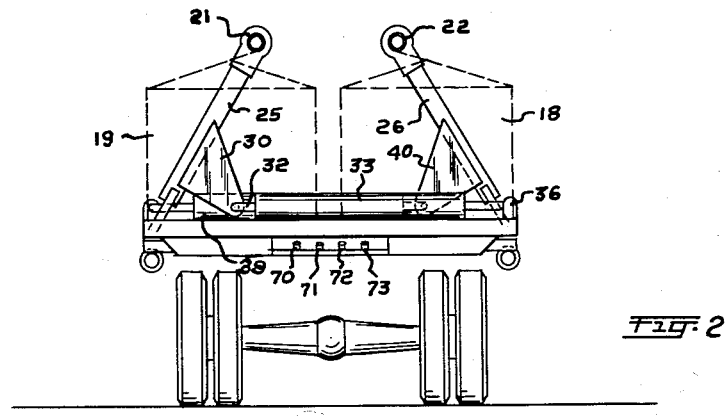
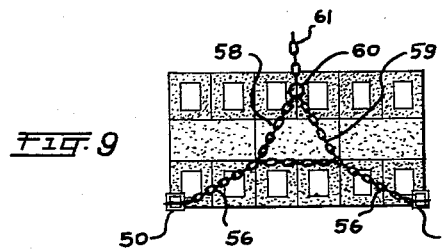
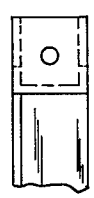
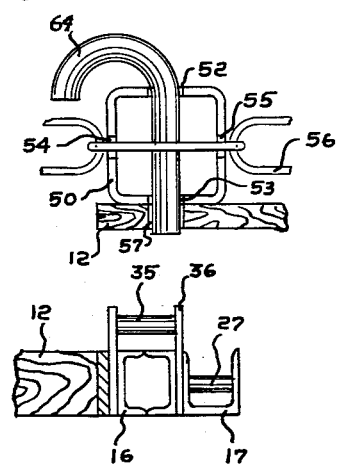
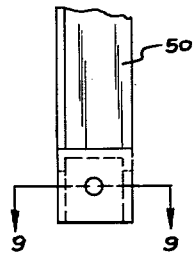
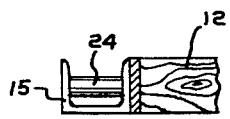

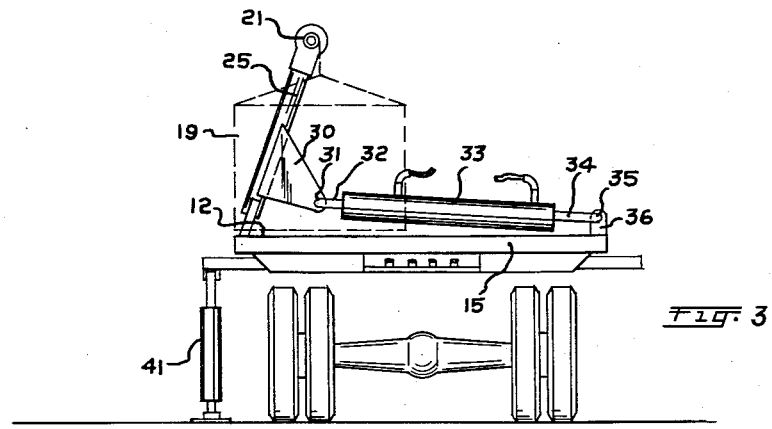
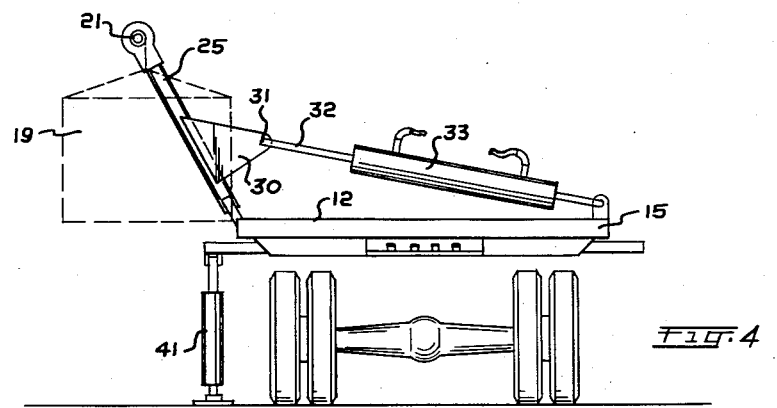
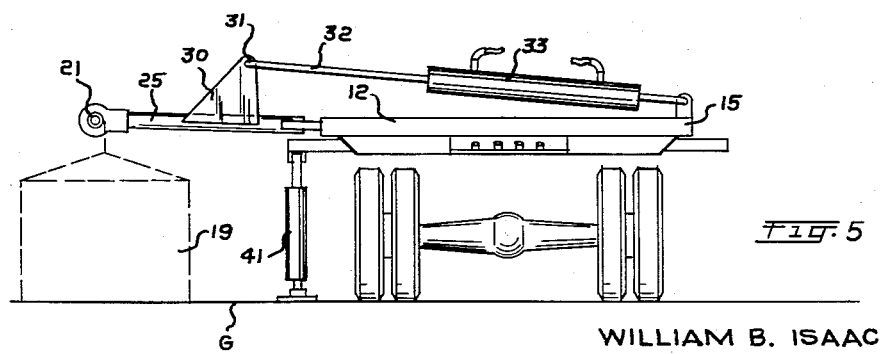

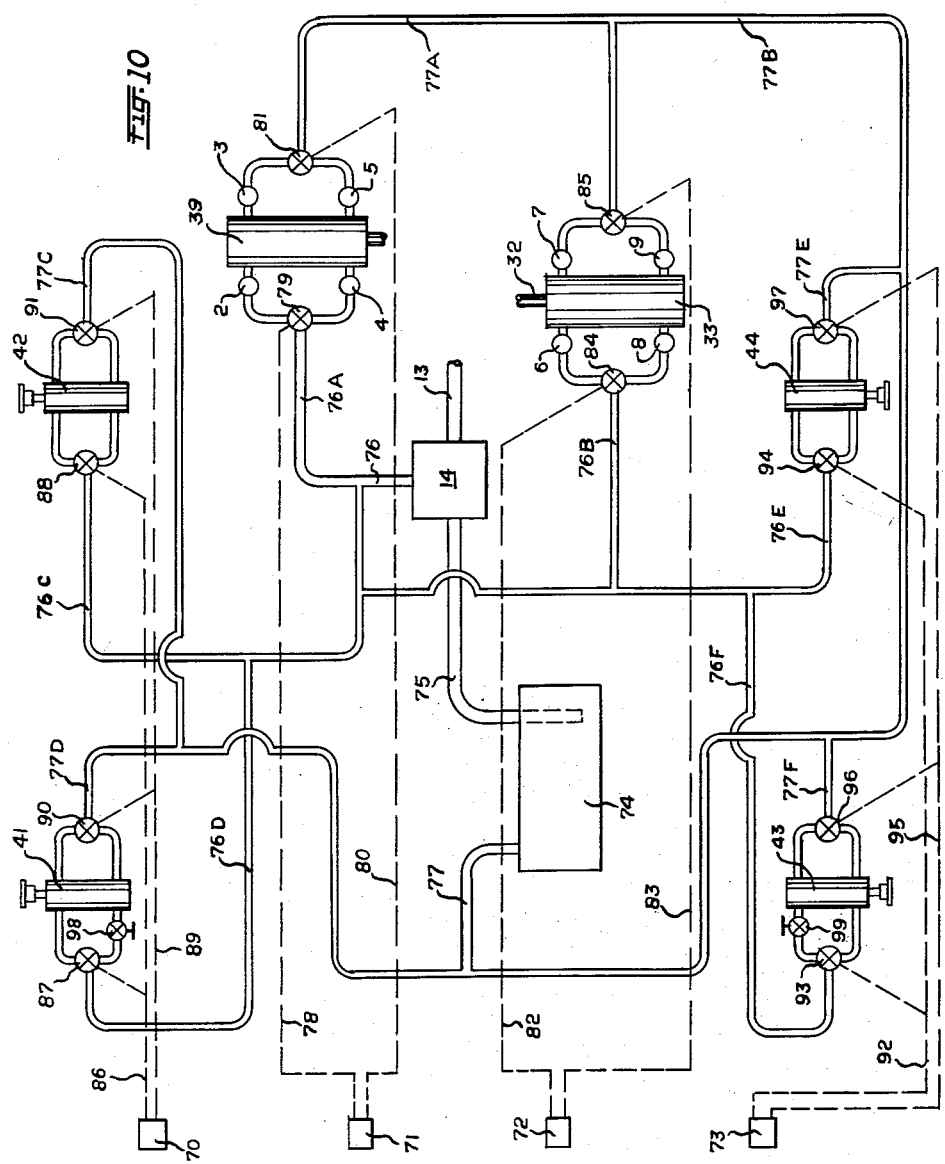

2,971,661

VEHICULAR-MOUNTED APPARATUS FOR LOADING AND UNLOADING PACKAGED LOADS AT A SIDE OF THE VEHICLE

William Bruce Isaacs, Jr., 1240 Standish Way, Lexington, Ky.

Filed Jan. 14, 1958, Ser. No. 708,836

3 Claims. (Cl. 214—80)

This invention relates to an improved apparatus for handling material in packaged form and more particularly, to the loading and unloading of heavy loads of such material upon vehicles which transport that material.

The advantages in mechanized handling of heavy materials, such as concrete blocks, in packaged loads, as upon pallets, has long been appreciated in view of the savings in labor and lessened damage to the material made possible by such mechanization. However, so far as I am aware, all such equipment suggested for this purpose has been subject to one or more limitations which it is a purpose of my invention to overcome. In general, such equipment, when self-contained upon the vehicle which transports the load, has required special purpose vehicles which are expensive, which have excessive head-room, which are heavy, and which often require special maneuvering of the vehicle in preparation for loading and unloading.

One of the objects of my invention is to provide an improved vehicular-mounted apparatus for handling packaged loads and which may be readily mounted upon and dismounted from a standard general purpose vehicle.

Another object is to provide an improved vehicular-mounted apparatus for handling packaged loads by loading and unloading such loads from each side of the vehicle on which the apparatus is mounted.

A further object is to provide an improved vehicular-mounted apparatus for handling packaged loads and which is selectively operable by power furnished by the prime mover of the vehicle.

A further object is to provide an improved vehicular-mounted apparatus for handling packaged loads of concentrated weight and which is mounted upon the vehicle in a manner serving to relieve the vehicular body of destructive stresses.

Still another object is to provide a vehicular-mounted apparatus for handling packaged loads and having an improved superstructure for supporting a load during handling of the same.

In carrying out the invention, I provide an apparatus which may be readily adapted to a standard, general purpose vehicle such as a flat-bed motor truck having its usual prime mover with a power take-off shaft therefrom. A conventional pressure fluid circuit is permanently installed on the under side of the truck bed and simple stress beams for mounting of the load lifting portions of the apparatus are affixed transversely to the truck bed at the front and rear ends thereof. Thus, when the vehicle is to be used for general purpose work, the bed thereof is unobstructed. When, however, the vehicle is to be employed in accordance with the invention, a superstructure, including one or more torsion members, is detachably mounted upon the truck bed by simple pivotal engagement with the stress beams and a simple pressure fluid actuated means is likewise detachably mounted upon the truck bed by pivotal engagement with that superstructure and with one of these stress beams. When thus installed, the superstructure is adapted to lift and lower packaged loads to and from the truck bed upon selectively controlled actuation of the pressure controlled means to which the pressure fluid is supplied from the permanently installed fluid circuit. The superstructure moreover serves to move the loads over the sides of the truck bed, rather than over the end thereof, thus permitting easier loading and unloading and less maneuvering of the vehicle.

The novel features which I believe to be characteristic of my invention are set forth with particularity in the appended claims. My invention itself, however, both as to its organization and method of operation, may be best understood by reference to the following description taken in conjunction with the accompanying drawings in which:

Fig. 1 is a side elevation view of a motor truck equipped with the vehicular-mounted apparatus of the invention and with parts broken away;

Fig. 2 is a rear-end view of the truck of Fig. 1, and with the rearward supporting arms removed;

Fig. 3 is a rear-end view of the truck showing an initial step of unloading of a packaged load, parts being omitted for purposes of clarity;

Fig. 4 is a view similar to Fig. 3 showing an intermediate step of unloading;

Fig. 5 is a view similar to Fig. 3 showing a final step of unloading;

Fig. 6 is a plan view of the flat bed of the truck of Fig. 1;

Fig. 7 is a view partly in section on line 7—7 of Fig. 6;

Fig. 8 is a view partly in section on line 8—8 of Fig. 6;

Fig. 9 is a rear-end view of a packaged load showing one form of load-lifting means;

Fig. 9A is a plan view of a load-engaging member shown in Fig. 9;

Fig. 9B is a sectional view taken on line 9—9 of Fig. 9A and showing a detail of the load-engaging member; and Fig. 10 is a schematic view of one form of pressure fluid circuit suitable for use with the truck shown in Fig. 1.

Referring now to Fig. 1, a conventional, standard type motor truck 10 having a prime mover 11 and a flat bed 12 with unobstructed sides, is shown generally. A power take-off shaft 13 from the prime mover is arranged for selectively driving a pump or pumps 14 forming a part of a pressure fluid system permanently installed on the under side of bed 12 and later to be described. As a significant feature of the invention, a single stress beam 15 is affixed to the rearmost edge of the bed 12 extending transversely along substantially the entire edge thereof, and a pair of stress beams 16 and 17 are similarly affixed to the forwardmost edge of the same bed. These stress beams preferably are permanently installed upon the bed by any suitable affixing means not shown, such as bolts extending through slightly enlarged holes in the beams and anchored within the bed structure. Packaged loads of substantial size and weight are carried upon the flat bed 12 and, as indicated, generally by Figs. 1 and 2, may comprise four such loads, although as will be apparent, any number of such loads may be carried without departing from the invention. As indicated, a pair of loads 18 and 19 may be disposed side by side transversely of the bed and loads 18 and 20 may be disposed end to end longitudinally of that bed.

For the purpose of loading and unloading the loads positioned to one side of the longitudinal center line of the truck bed, a torsion member 21 is provided, and for the loads on the other side of the truck bed a similar, but somewhat longer torsion member 22 is provided. These torsion members may comprise a suitable rod having separately affixed larger diameter winding members rigidly affixed thereto, or, as shown herein, may comprise relatively light weight tubing formed of a high torsion strength steel and with an outer diameter suitable for winding purposes, for example, about 8 inches diameter. For simplicity, the construction and operation of the structure used to load and unload at one side of the truck by means of torsion member 21 only will be described, but it will be understood that, in all essential details, the other torsion member operates in the same way for loading and unloading at the opposite side of the truck. At one end, such as its rearmost end, torsion member 21 has mounted thereon a supporting rear arm 23 (Fig. 1) which is pivotally mounted at its lower end upon removable pivot pin 24 (Fig. 7) contained in the rear stress beam 15 adjacent the leftmost side of the truck bed. A similar rear arm similarly mounted in the same beam adjacent the righthandmost side of the truck bed is provided for torsion member 22. At its forward end, torsion member 21 has rigidly affixed thereto a somewhat larger supporting forward arm 25 which is pivotally mounted at its lower end upon a removable pivot pin (not shown) contained in the forward stress beam 16 adjacent the leftmost side of the truck bed. Similarly, at its forward end, the torsion member 22 has rigidly affixed thereto a forward arm 26 which is pivotally mounted at its lower end upon a removable pivot pin 27 (Fig. 8) contained in the forward stress beam 17 adjacent the righthandmost side of the truck bed. In each case, the torsion members lie parallel to the longitudinal axis of the truck bed and have their front and rear supporting arms of equal length so that both ends of the torsion member move in arcs of equal radii.

Intermediate its ends the forward arm 25 has rigidly attached thereto a plate 30 projecting toward the opposite side of the truck and containing a pivot pin 31. Attached to the pin is a piston rod 32 connected to a suitable piston (not shown) disposed in a double-acting pressure fluid cylinder 33. This cylinder in turn is pivotally mounted by means of a rod 34 attached to the other end of that cylinder. This rod is removably positioned as by a pivot pin 35 contained in an upstanding clevis member 36 which is rigidly affixed to stress beam 16 adjacent the righthandmost side of the truck bed.

In the same way, the forward arm 26 for torsion member 22 has a plate 40 connected to a pivoted double-acting pressure fluid cylinder 39 mounted upon a clevis rigidly affixed to stress beam 17 adjacent the lefthandmost side of the truck bed. As will thus be apparent, both of the torsion members may selectively be pivoted in arcs extending from a line relatively close to the longitudinal center line of the truck bed when the piston rods are fully retracted in cylinders 33 and 39, to a line well beyond the sides of the truck bed when the piston rods are fully extended from those cylinders.

Although not essential for the practice of the invention under all conditions, I prefer to equip the truck bed with a plurality of stabilizers here shown at 41, 42, 43 and 44. These stabilizers include double-acting pressure fluid cylinders having a rigid rod portion at one end which is pivotally mounted upon the truck bed or upon a short lateral extension thereof adjacent the corners of that bed. At their outer ends, each such cylinder includes a movable piston rod having a foot plate attached thereto for engagement with the ground surface G. Preferably, the stabilizers are attached to the truck bed and connected in the pressure fluid circuit at all times and may be placed in, or removed from, use merely by swinging them into the desired position. Thus, they do not interfere with the normal usage of the truck for general purpose work.

Referring now to Fig. 1, each packaged load to be handled by the superstructure includes a pair of flexible lifting slings comprising chains, cords or the like which act in a vertical plane adjacent the ends of that load and longitudinally of the torsion members. For example, load 20 includes a pair of slings 46 and 47, the uppermost ends of which are securely fastened to the outer surface of torsion member 22 as by welded hasps 48 and 49. Accordingly, as member 22 is rotated from its innermost position inboard of bed 12 to its outermost position outboard of that bed, the slings are wound thereon. When rotated in the opposite direction the slings, of course, are unwound therefrom. Various forms of slings may be used as the load-lifting means and in Figs. 9, 9A and 9B one preferred form is shown, it being understood that other forms may be used equally well when pallets or other structures for supporting and handling packaged loads are employed.

As seen in Fig. 9, a plurality of tiers of concrete blocks are loosely assembled in the general form of a cube preparatory to handling as a packaged load. The lower parallel side corners of the cube rest upon elongated angle members 50 and 51, respectively, which extend longitudinally of the truck bed. Adjacent each end, the angle members include a box-like member fastened thereto, as seen in Fig. 9B, this box member, as well as the angle member, having apertures 52 and 53 for reception of a J-shaped retaining pin 64. Likewise, the box and angle-member includes slots 54 and 55 for reception of links of a chain 56, the pin 64 being adapted to extend through a link of the chain and to pass into a suitable aperture 57 in the bed 12 of the truck adjacent an outer side edge thereof. At the corresponding end of angle member 51 the chain 56 is detachably anchored to the box portion thereon. Intermediate the ends of chain 56 at equal distances from the center thereof, two branch chains 58 and 59 are connected thereto, these branch chains being attached at their upper ends to a common ring 60. Extending upwardly from the ring is a lifting chain 61 which is rigidly connected at its other end to a torsion member of the superstructure. Thus, the cube of blocks may be deposited with one side edge thereof upon the angle member 51, as by a fork lift truck, and the other angle member 50 may be slipped under the opposite side edge of that cube. Upon exertion of lifting force by chain 61, the branch chains 58 and 59 pull the angle members 50 and 51 closer together due to the horizontal component of force, while the vertical component of the lifting force tends to lift those angle members and the load supported thereon. The frictional engagement of each of the blocks in the cube with its adjacent blocks holds the entire cube as an assembled package so long as force is applied by chain 61.

Referring now to Fig. 10, one form of a pressure fluid system for operating the above-described apparatus is shown schematically. It will be understood that this system may be simplified by incorporating the several valves into a more compact arrangement and by shortening the several fluid conduits without departing from my invention. For example, a tandem pump arrangement furnishing equal volumes of a hydraulic-type fluid at equal pressures for simultaneously operating the main lifting cylinders and for operating the stabilizer cylinder or cylinders may be used in lieu of the single pump, which I have shown only for simplicity. In general, I provide four operating stations 70, 71, 72 and 73 grouped at a convenient location for operating the apparatus, preferably where the operator can watch the behavior of the load. I have found, for example, that locating these stations at the rear edge of the truck, as seen in Fig. 2, results in a suitable arrangement. With take-off shaft 13 rotating, a suitable centrifugal pump arrangement 14 draws a pressure fluid from reservoir 74 through conduit 75 and delivers it under elevated pressure of about 1000 pounds per square inch gauge, for example, into manifold 76 from which branches 76A, 76B, 76C, 76D, 76E and 76F direct that fluid under pressure to the ends of the several double-acting cylinders. A return manifold 77 leads into the reservoir and receives fluid at substantially atmospheric pressure from branch conduits 77A, 77B, 77C, 77E and 77F, which in turn are connected with the discharge from the ends of the several double-acting cylinders. At operating station 71 a suitable actuating means such as a pull and push rod 78 is located for selectively actuating the inlet valve 79 for cylinder 39 and a similar means 80 is provided for actuating the exhaust valve 81 of that cylinder. Likewise, at operating station 72 actuating means 82 and 83 are provided for operating similar inlet and outlet valves 84 and 85, for cylinder 33. Between the respective inlet and outlet valves 79, 84 and 81, 85 for the cylinders 39 and 33 and the ends of those cylinders, I also provide suitable bleed check valves as seen at 2 to 9, inclusive. These valves permit fluid to move freely in one direction but cause it to pass through a restriction when moving in an opposite direction and thus permit snubbing of the movement of the superstructure after it passes its topmost point of movement.

Since both stabilizers on a given side of the truck are normally used simultaneously, I provide a single actuating means 86 for operating from station 70 the inlet valves 87 and 88 of the stabilizers 41 and 42 as well as a single actuating means 89 for operating from that station the outlet valves 90 and 91 of those stabilizers.

Similarly, at station 73 I provide a single actuating means 92 for operating the inlet valves 93 and 94 of stabilizers 43 and 44 and a single actuating means 95 for operating the outlet valves 96 and 97 of those stabilizers. In addition, when exceptionally heavy loads are being handled, as, for example, concrete blocks weighing in the order of 3,000 pounds per package, supplementary stop cocks may be profitably employed in certain of the stabilizer lines. As shown, stop cocks 98 and 99 may be located in the pressure lines leading to the top of the rear stabilizer cylinders 41 and 43 for manual closing thereof following the desired extension of the piston rods from those cylinders. In this way, any unequal stresses tending to be set up in the truck bed by the load being handled on one side only cannot force pressure fluid backward from one stabilizer into the pressure conduits and thence into the other stabilizer on the same side.

With the foregoing description in mind, reference now is made to Figs. 3, 4 and 5 showing the several steps of operation of the apparatus during the unloading of a packaged load 19 from the truck. As pressure fluid is supplied to cylinder 33 through valve 84 for extension of piston rod 32, the superstructure rotates to the left around its pivot points on stress beams 15 and 16. As the torsion member 21 moves to the left (Fig. 3) the upper portion of the flexible load-lifting sling is wound thereupon, thus shortening the distance between the load and the torsion member, which distance is hereinafter called the "free length" of the sling. When the tangent line of that sling portion wound on the torsion member is in a vertical plane above the center of load 19 at rest on the truck bed 12 (the necessary dimensions of the sling and superstructure being predetermined for this effect) the torsion member begins to lift the load from the truck bed. As piston rod 32 is farther extended, the superstructure rotates farther to the left, more of the sling being wound upon the torsion member, with a corresponding diminution of the free length of the sling, and with more clearance between the bottom of the packaged load 19 and the truck bed 12 resulting therefrom. Meanwhile, the load 19 which is out of contact with the truck bed is swung toward the side of the truck. After passing the uppermost part of its arc of travel, the superstructure then begins its descent into the position shown at Fig. 4, a sufficient amount of the sling having been wound upon the torsion member 21 to compensate for the drop of member 21 from its uppermost point of travel with the result that the innermost edge of load 19 clears the side of truck bed 12 as the superstructure descends. Continued extension of piston rod 32 brings the superstructure into the position shown generally in Fig. 5 with the load 19 resting upon the ground level G. During the described stages of operation the stabilizers 41 and 42 assist in relieving the truck of forces tending to tip the truck transversely. However, when off-loading to both sides is done simultaneously, as is possible with my invention, use of stabilizers is not normally required.

Upon seating of load 19 on the ground, or preferably, upon a suitable membrane or other object resting on the ground for keeping the load clean, the sling members, such as the angle members 50 and 51 of Fig. 9, are detached from the load and the superstructure is returned to its original position by reversal of fluid flow to cylinder 33. It will be understood that the drainage of fluid from this cylinder through valve 85 is suitably regulated in accordance with the flow into that cylinder through valve 84 to the end that the load 19 may be unloaded safely. For example, as the superstructure begins its downward unloading movement, the effect of gravity tends to pull piston rod 32 outwardly from cylinder 33 and the movement is therefore snubbed by controlling the fluid displaced from that cylinder by action of the appropriate bleed check valves. Moreover, as the superstructure begins its downward movement during unloading, the beams 15 and 16 are placed in compression rather than in tension. Heretofore, such forces have been resisted by heavy bracing of the truck bed, thus increasing the cost and weight of the apparatus and in general making of it a special purpose vehicle. In the present apparatus, I am enabled to use simple light weight beams 15, 16 and 17 (Figs. 7 and 8) which are self-contained insofar as their tension and compression stresses are concerned. For example, in beam 16, as the load 19 is being lifted, the rod 34 of cylinder 33 pushes against clevis 36 at one end of the beam and the arm 25 pushes against its pivot pin at the other end of the same beam, thus placing it in tension. No force is transmitted from that beam to the end of the truck bed on which it is supported. Thus, no bending of the truck bed, as would be the case if the clevis and arm were directly attached thereto, occurs. Similarly, when beam 16 is placed in compression, no bending stress is transmitted to the truck bed. Insofar as the superstructure for unloading loads 18 and 20 is concerned, beam 17 functions in the same way.

Various advantages of the above-described apparatus will be noted by those skilled in the art. For example, loads may be unloaded at either side of the vehicle merely by selectively controlling cylinders 33 and 39 from stations 72 and 71. When the loaded truck arrives at its unloading destination, the necessary stabilizers are placed in operative position and unloading can take place, without maneuvering of the truck, as is required with end-unloading apparatus. It will also be obvious that the described apparatus is equally well adapted for loading of a truck. It this usage, Fig. 5 represents the initial step of loading and Fig. 3 represents the final step of loading. Since cylinders 33 and 39 are double-acting, the superstructure can be moved under pressure in either direction of rotation.

Furthermore, as seen in Figs. 1 and 2, the superstructure can be rotated to a position in which the torsion members lie adjacent the center line of the truck bed and which represents a substantial drop in elevation from their uppermost position. Thus, a loaded truck has a comparatively low head room during travel. The invention, moreover, provides for ease of removal and assembly of the superstructure upon the truck bed. By disconnecting the rod 34 of cylinder 33 from clevis 35 and by removing the pins by which the front arm 25 and the rear arm 23 are connected, respectively, to stress beams 16 and 15, that part of the superstructure can be quickly removed. Conventional quick-disconnect couplings for the pressure fluid connections to the cylinders 33 and 39 also are used. Likewise, the superstructure, including torsion member 22 and its front and rear supporting arms, is quickly removable. After such removal, the flat truck bed 12 is available for general purpose work.

When employing a sling arrangement, such as shown in Fig. 9B, the J-type pin 64 may have its longer end engaged in an aperture of the truck bed during travel of the loaded truck and thus assists in preventing shifting of the load and of the angle members. When loading the truck from the ground level, that pin may have its longer end disposed externally of the box and as the load begins to settle into position on the truck bed, such longer arm will engage against the outermost side edge of the truck bed and thus guide the load as it settles in position.

While I have described my improved apparatus for use with heavy concentrated loads it will be apparent that it is equally well adapted for handling any type of load which is packaged and which may be lifted and lowered during movement transversely of the truck bed.

In accordance with the patent statutes, I have described what at present is considered to be the preferred embodiment of the invention, but it will be obvious to those skilled in the art that various changes and modifications may be made therein without departing from the spirit and scope of the invention and I, therefore, aim to cover, in the appended claims, all such equivalent variations and modifications.

What is claimed is:

1. In combination, a vehicle for carrying packaged loads and having self-contained loading and unloading means including a prime mover, a flat vehicular bed having unobstructed sides and terminating at side edges disposed in the plane of said bed, a superstructure mounted on said bed and comprising a torsion member extending longitudinally of said bed and having first and second arms of equal and fixed length supporting said member at the respective ends thereof, said member being disposed above the load at all times, one end of each of said arms being pivotally mounted on pins extending from the respective front and rear edges of said bed and located closely adjacent one side edge of said bed and the other end of each of said arms being fixedly attached to said member whereby said member may be pivoted as a unit in an arc extending from a first vertical plane inboard of said bed to a second vertical plane outboard of said bed, a flexible load-lifting means of predetermined length attached at one end to, and in winding and unwinding relation upon said member and detachably connected at a second end to said load and being adapted to remain attached to said load at all times while said load is in motion, the length of said load-lifting means in contact with said member being increased as said superstructure is moved from said first plane to said second plane and with a corresponding diminution of the free length of said load-lifting means between the point of tangency thereof with said member and the point of connection thereof with said load, said member having a periphery in contact with said load-lifting means sufficiently large to insure a diminution of said free length adequate to enable said superstructure to swing said load over the said one side edge of said bed during movement from said first plane to said second plane, a fluid pressure system carried by said bed and including a pump driven by said prime mover and a double-acting pressure fluid cylinder, said cylinder being pivotally mounted on said bed adjacent the side opposite to the mounting of said superstructure thereon, said cylinder having piston means attached to said first arm for pivotally moving said superstructure in said arc, and control means for supplying pressure fluid from said pump to alternate ends of said cylinder for effecting movement of said member in a selected winding and unwinding direction, whereby said load may be loaded upon or unloaded from said bed by movement across the said one side edge thereof as said superstructure is moved by said piston means.

2. Apparatus as defined in claim 1 including a first stress beam supported transversely of said bed at one end of said bed, a second stress beam supported transversely of said bed at the opposite end of said bed, each of said stress beams having a pin for mounting said first and second arms of said superstructure, said first and second arms of said superstructure being pivotally mounted upon said pins at the respective ends of said first and second beams adjacent said one side edge of said bed, and said cylinder being pivotally mounted upon said first stress beam adjacent the other side edge of said bed.

3. In combination, a vehicle for carrying packaged loads and having self-contained loading and unloading means including a prime mover, a flat vehicular bed having unobstructed sides, a first superstructure mounted upon said bed and comprising a first torsion member extending longitudinally of said bed and having first and second arms of equal and fixed length supporting said first member at the respective ends thereof, one end of each of said first and second arms being pivotally mounted on said bed adjacent a first side of said bed and the other end of each of said first and second arms being fixedly attached to said first member, a second superstructure mounted on said bed and comprising a second torsion member extending longitudinally of said bed and having third and fourth arms of equal and fixed length supporting said second member at the respective ends thereof, one end of each of said third and fourth arms being pivotally mounted on said bed adjacent the second side of said bed and the other end of each of said third and fourth arms being fixedly attached to said second member, each of said members being disposed above their respective loads at all times and being adapted to move in respective arcs extending from first vertical planes inboard of said bed to second vertical planes outboard of said bed, each of said members having flexible load-lifting means of predetermined length attached at one end to, and in winding and unwinding relation upon the respective members and detachably connected at their second ends to their respective loads and being adapted to remain attached to said loads while said loads are in motion, the length of each of said load-lifting means in contact with their respective members being increased as their respective superstructures are moved from their respective first planes to their respective second planes, and with a corresponding diminution in the free length of said respective load-lifting means between the respective points of tangency thereof with their respective members and the points of connection thereof with their respective loads, said members having peripheries in contact with the respective load-lifting means sufficiently large to insure a diminution in said free lengths adequate to enable said superstructures to swing their respective loads over the respective sides of said bed during movement from their respective first planes to their respective second planes, a fluid pressure system carried by said bed and including a pump driven by said prime mover and first and second fluid pressure double-acting cylinders, said first cylinder being pivotally mounted on said bed adjacent the second side thereof, said first cylinder having piston means attached to said first arm for pivotally moving said first superstructure, said second cylinder being pivotally mounted on said bed adjacent the first side thereof, said second cylinder having piston means attached to said third arm for pivotally moving said second superstructure, and control means for supplying pressure fluid from said pump to alternate ends of each of said first and second cylinders for effecting movement of each of said members in selected winding and unwinding directions, whereby the respective loads may be loaded upon or unloaded from said bed by movement across the sides thereof as said superstructures are moved by said respective piston means.

References Cited in the file of this patent

UNITED STATES PATENTS

| | | |
|---|---|---|
| 2,183,813 | Howard et al. | Dec. 19, 1939 |
| 2,189,052 | Anthony | Feb. 6, 1940 |
| 2,386,216 | Hay | Oct. 9, 1945 |
| 2,479,758 | McDermott | Aug. 23, 1949 |
| 2,771,197 | Leffler | Nov. 20, 1956 |
| 2,787,383 | Antos et al. | Apr. 2, 1957 |
| 2,848,123 | Keys | Aug. 19, 1958 |